United States Patent [19]

Carlson et al.

[11] 4,285,040
[45] Aug. 18, 1981

[54] DUAL MODE VIRTUAL-TO-REAL ADDRESS TRANSLATION MECHANISM

[75] Inventors: Lewis R. Carlson; Dennis C. Gassman, both of Salt Lake City, Utah

[73] Assignee: Sperry Corporation, New York, N.Y.

[21] Appl. No.: 110,511

[22] Filed: Jan. 8, 1980

Related U.S. Application Data

[63] Continuation-in-part of Ser. No. 848,535, Nov. 4, 1977.

[51] Int. Cl.³ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,435,420 | 3/1969 | Wissick | 364/200 |
| 3,693,165 | 9/1972 | Reiley et al. | 364/200 |
| 3,761,881 | 9/1973 | Anderson et al. | 364/200 |
| 3,764,996 | 10/1973 | Ross | 364/200 |
| 3,800,291 | 3/1974 | Cocke et al. | 364/200 |
| 3,824,561 | 7/1974 | Wolf | 364/200 |
| 3,829,840 | 8/1974 | Burke et al. | 364/200 |
| 3,839,706 | 10/1974 | Borchsenius | 364/200 |
| 3,840,864 | 10/1974 | Chang et al. | 364/200 |
| 3,854,126 | 12/1974 | Gray et al. | 364/200 |
| 4,047,160 | 9/1977 | Wolf | 364/900 |
| 4,051,461 | 9/1977 | Mashimoto et al. | 364/200 |
| 4,056,845 | 11/1977 | Churchill, Jr. | 364/200 |
| 4,064,558 | 12/1977 | Hughes et al. | 364/900 |
| 4,068,303 | 1/1978 | Morita | 364/200 |
| 4,075,694 | 2/1978 | Ericsson | 364/200 |

OTHER PUBLICATIONS

G. M. Bull et al., Time-Sharing Systems, McGraw-Hill (UK) Ltd., 1971, pp. 52-60 and 66-86.

Primary Examiner—Gareth D. Shaw
Assistant Examiner—David Y. Eng
Attorney, Agent, or Firm—John P. Dority; William E. Cleaver; Marshall M. Truex

[57] ABSTRACT

A mechanism in a computer system translates a program-generated virtual address into a real address of at least a portion, such as a byte, of a segment of the storage of the computer system. The translation mechanism is operable in either of two modes for forming the real storage address. In either mode of operation of the translation mechanism, a first portion of the virtual address is utilized to select a predetermined one of a plurality of segment descriptors, each having a first field portion and a second field portion. The first field portion of the selected segment descriptor indicates whether the structure of the storage segment is comprised of contiguous blocks or noncontiguous subsegments of storage and correspondingly causes operation of the mechanism in the first mode wherein the real address is formulated from the second field portion of the selected segment descriptor and other portions of the virtual address or in the second mode wherein the real address is formulated from another portion of the virtual address and a field portion of a subsegment descriptor selected by the second field portion of the selected segment descriptor.

5 Claims, 8 Drawing Figures

DUAL MODE VIRTUAL-TO-REAL ADDRESS TRANSLATION MECHANISM

This is a continuation in part of application Ser. No. 848,535 filed Nov. 4, 1977.

BACKGROUND OF THE INVENTION

1. Field of the Invention

The present invention broadly relates to the addressing of real storage in a computer system and, more particularly, is concerned with a virtual address translation mechanism for formulating a real storage address of at least a portion of either a contiguous or noncontiguous segment of storage.

2. Description of the Prior Art

Contemporary computer systems often are accessible to a plurality of users, programs and instruction processors, and in such cases they operate in a multiprocessing/multiprogramming environment on multiple programs stored in the storage or memory of the system. The individual user writes his program as though it is to be run by itself, and the program may use all the system resources accordingly. The computer system provides the services necessary to support the program and coordinate it with other programs and system hardware elements in operation. The physical hardware in the system is combined with an executive program to simulate a more powerful hardware machine for which the programs are written. Within this type of multiprocessing environment, it appears to each user that he has his own dedicated computer system.

However, operation of a computer system in a multiprocessing/multiprogramming environment introduces storage addressing problems. The real or physical storage addresses in one program must not conflict with the real storage addresses in another program. Hence, conventional physical addressing concepts are difficult to implement in a multiprocessing system.

Therefore, contemporary multiprocessing computer systems ordinarily utilize some form of virtual addressing. With virtual addressing, the user writes his program as though the program is to be run by itself on its own, or virtual, machine. Several programs may refer to the same virtual address, but these correspond to different real storage addresses. Thus, a multiprocessing computer system must include some means to convert or translate virtual addresses into real addresses. Further, the system must include some means for assuring that the translations are made properly so that a virtual address in one program only refers to its corresponding real address and not to some other real address which corresponds to the same virtual address in another program.

The operation of a computer system in a multiprocessing environment with any form of virtual addressing raises storage space allocation and utilization problems. Prior art systems have employed a variety of storage allocation and utilization schemes. These schemes predominately fall into three categories: segmentation; paging; or some combination of both. In devising an optimum scheme for a given computer system, compromises or trade-offs must be struck between a number of factors.

SUMMARY OF THE INVENTION

The present invention provides a unique virtual-to-real address translation scheme in a computer system which facilitates efficient hardware mechanization of storage allocation, storage address extension and access protection. This capability is particularly valuable, although not so limited, to computer systems performing data communication functions since conventional software storage management techniques tend to be inefficient in their consumption of system resources in a real time environment.

While the translation scheme of the present invention is best characterized by segmentation where the smaller virtual address space of each user is mapped anywhere throughout the larger real address space of the system's storage through allocation of storage on a segment basis thereby allowing mapping into a contiguous segment of storage having a predetermined maximum size, the scheme also employs a segment paging technique which alternatively allows mapping of the virtual address space into noncontiguous subsegments of storage having a smaller predetermined maximum size. In other words, the translation scheme as implemented is operable in two modes, a contiguous segment mode and a noncontiguous subsegment mode. Such implementation provides a fine granularity in storage allocation, while still allowing high speed storage references when necessary. Although some additional overhead is associated with address formulation in the subsegment mode wherein the advantages of fine granularity are utilized, this appears to be a reasonable price to pay for a flexible storage allocation scheme.

Accordingly, the present invention provides a mechanism in a computer system for translating a program-generated virtual address into a real address of at least a portion, such as a byte, of a segment of the storage of the computer system. Address translation may be performed in either of two modes for formulating the real storage address. In either mode of operation, a first portion of the virtual address is utilized to select a predetermined one of a plurality of segment descriptors, each having a first field portion and a second field portion. The first field portion of the selected segment descriptor indicates whether the structure of the storage segment is comprised of contiguous blocks, forming a contiguous segment of storage, or noncontiguous subsegments, forming a noncontiguous segment of storage, and correspondingly causes address translation to proceed in the first or second mode.

In the first mode, the real address is formulated from the second field portion of the selected segment descriptor and other portions of the virtual address. Specifically, a second portion of the virtual address is added to the second field portion of the selected segment descriptor to form a sum thereof, and a third portion of the virtual address is concatenated onto the sum to form the real address.

In the second mode, the real address is formulated from another portion of the virtual address and a field portion of a subsegment descriptor selected by the second field portion of the selected segment descriptor. Specifically, a second portion of the virtual address is concatenated onto the second field portion of the selected segment descriptor for selecting a predetermined one of a plurality of subsegment descriptors. Then, a third portion of the virtual address is concatenated onto a field portion of the selected subsegment descriptor to form the real address.

In the hardware implementation of the translation mechanism, means are provided for containing a table comprised of the plurality of segment descriptors. Also, the mechanism includes control means which respond to the first field portion of the selected segment descriptor for specifying which one of the two modes of operation the mechanism is to proceed in for translating the virtual address into the real storage address. The subsegment descriptors are contained in a table stored in the storage of the system. Therefore, when the mechanism is operating in the second or subsegment mode, it is necessary to make an extra cycle to select and fetch one of the subsegment descriptors.

In addition to the first and second field portions of the segment descriptor as mentioned above, the descriptor also contains other field portions which specify whether the segment is resident or not, for what particular functions access can be made to the segment and what is the length of the segment. The subsegment descriptor also contains another field for specifying whether the subsegment is resident or not.

DETAILED DESCRIPTION OF THE INVENTION

INTRODUCTION

Figure 1:
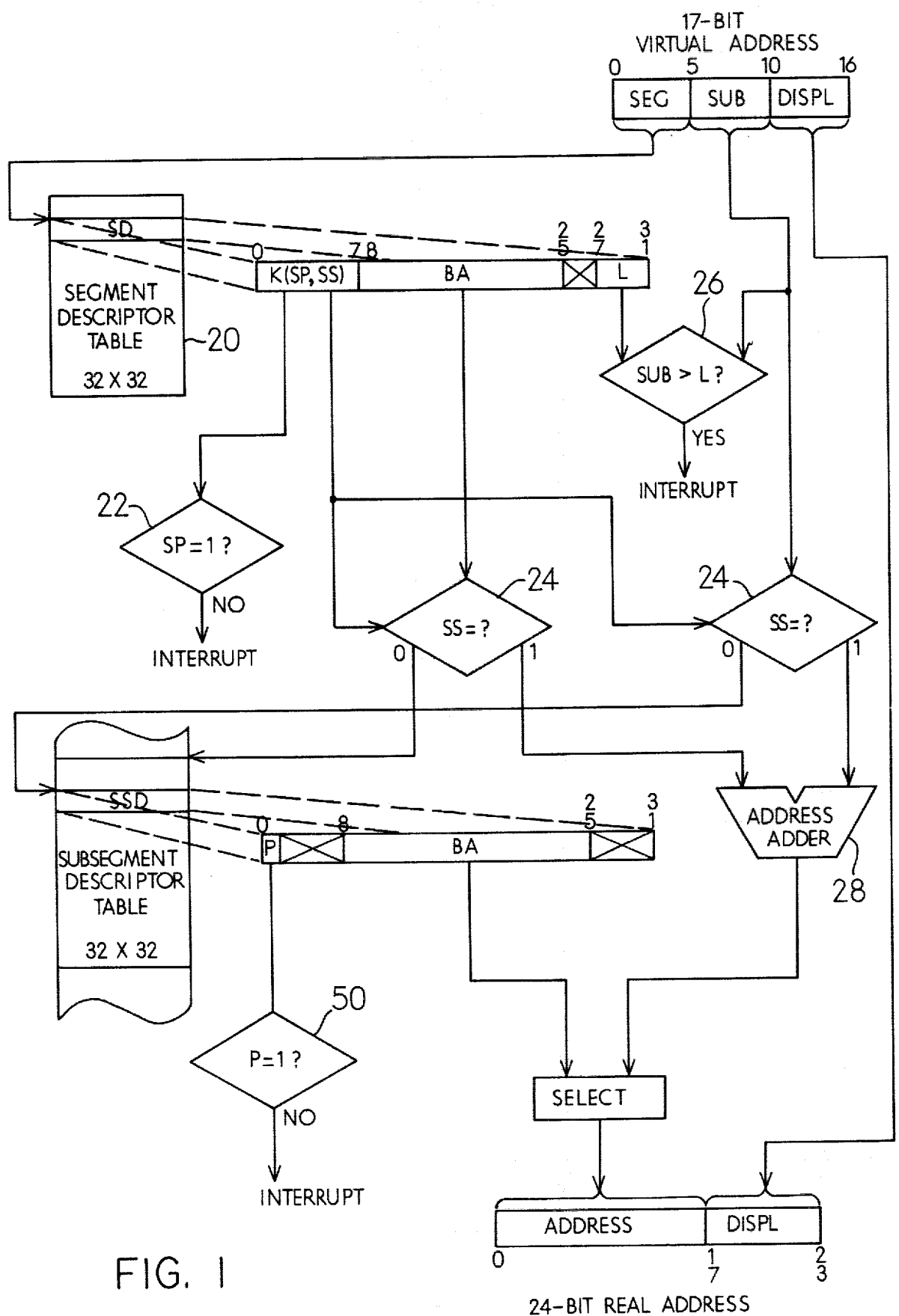
FIG. 1 is a flow chart diagrammatic representation of the virtual-to-real address translation technique underlying the present invention, illustrating both the segment and subsegment modes of operation along with various attribute checks which are carried out during operation in these respective modes.

Since the present invention resides primarily in the novel structural combination and the method of operation of wellknown computer circuits and devices, and not in the specific detailed structure thereof, the structures, control and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention.

In the description of the preferred embodiment of the present invention which follows, initially the preferred compositions of a virtual address, a segment descriptor and a subsegment descriptor will be discussed in reference to FIG. 1. Following thereafter, the virtual-to-real address translation mechanism and its operational steps will be explained in detail in reference to FIGS. 1 through 5C. However, before continuing on to an explanation of the virtual address and the segment and subsegment descriptors used in formulation of the real address, it would be worthwhile to first present a brief overview of the present invention.

ADDRESS TRANSLATION OVERVIEW

The virtual-to-real address translation mechanism of the present invention preferably will be incorporated as part of the processor hardware of a general-purpose computer system, such as the Sperry Univac 3760 Communications Controller Computer manufactured by the Sperry Univac Division of Sperry Corporation and described in General Description Manual No. UP 7976, Rev. 1. It facilitates operation of the processor in a multiprocessing environment on programs stored in a local storage. The mechanism translates a virtual address known to program software into a real address known to storage hardware. The translation mechanism itself is invisible to the program software.

In an exemplary embodiment, the translation mechanism, in deriving a 24-bit real storage address from a 17-bit virtual address, is capable of mapping a 128K (131,072) byte virtual address space of a user into a 16M (16,772,216) byte physical or real address space of the storage of the computer system. The mapping technique employed by the mechanism is unique in that the 128K bytes of virtual address space which is contiguous to the user may actually be comprised of a combined total of up to 32 contiguous and noncontiguous segments of 4K (4096) bytes each anywhere in the 16M byte real storage. A segment of storage contains up to 4K bytes of data in increments of 128 bytes. Thus, a contiguous segment may be comprised of up to 32 contiguous blocks of 128 bytes each, while a noncontiguous segment may be comprised of up to 32 noncontiguous subsegments of 128 bytes each. Therefore, both the contiguous and noncontiguous segments each have the same granularity. One granule is 128 bytes of contiguous storage. As a result, the virtual address space accessable by the user program consists of 128K bytes from throughout the real storage with a minimum granularity of 128 bytes. Additionally, the virtual space may be comprised of any combination of contiguous segments (fast access, 4K byte granularity) and noncontiguous segments (slower access, 128 byte granularity) as application needs dictate.

The real storage address of a contiguous segment of data is generated directly from a segment descriptor contained in a table of 32 segment descriptors resident in hardware registers of the translation mechanism for purposes of fast access. The real storage address of a noncontiguous segment of data is generated indirectly from a segment descriptor, i.e., through a subsegment descriptor specified by the segment descriptor and selected from a table of 32 subsegment descriptors residing in storage.

The segment and subsegment descriptor tables which provide the correspondence links between the user's virtual address space and the real storage address space are set up by the executive program in the computer system and are not accessible for modification by the user's application programs.

THE VIRTUAL ADDRESS

In the flowchart depicted in FIG. 1, there is shown the preferred format for a virtual address. The virtual address, which is formed in a conventional manner from any one of several program instructions, is a 17-bit byte address composed of a segment field SEG (bits 0-4), a subsegment field SUB (bits 5-9) and a displacement field DISPL (bits 10-16). Parenthetically, it should be mentioned that throughout the detailed description, a bit numbering scheme is used that designates the most significant bit, for example, of a 16- or 32-bit word as bit 0 and the least significant bit as bit 15 or bit 31 respectively.

Therefore, the five most significant bits, being bits 0-4 of the segment field, of the virtual address specify a table entry address of a segment descriptor to be used in the address translation method. The seven least significant bits, being bits 10-16 of the displacement field, of the virtual address directly, without undergoing any change, provide the seven least significant bits of the real address. The particular use made of the middle five bits, 5-9, of the virtual address depends upon whether the translation mechanism is to generate the real address through a segment or subsegment mode of operation. These modes are separately illustrated in FIGS. 2 and 4 and in FIGS. 3 and 5A-5C respectively and will be described in detail later. For present purposes, it is enough to point out that if the segment mode of operation is specified the middle five bits of the virtual address are used in calculating the real address. On the other hand, if the subsegment mode of operation is specified the middle five bits are used in forming a table entry address of a subsegment descriptor.

SEGMENT DESCRIPTOR

In FIG. 1, there is also shown the preferred format for a segment descriptor (SD). The segment descriptor is a 32-bit word comprised by an access key field K (bits 0-7), a base address field BA (bits 8-24) and a length field L (bits 27-31). Bits 25 and 26 are not used and are both set to binary 0s.

The bits in the K field determine several things. First, bit 0, denoted SP, specifies whether or not the segment is present in local storage. If bit 0 is set to binary 1, the segment is currently resident in storage. If bit 0 is set to binary 0, the segment is not resident and the initiation of a segment reference in this case causes the generation of an interrupt. Next, bit 1, denoted SS, of the K field specifies the segment structure, i.e., whether it is contiguous or noncontiguous. If bit 1 is set to binary 1, the segment is defined as being comprised of up to 32 contiguous blocks of storage containing 128 bytes each or up to 4K (4096) bytes of contiguous storage. If bit 1 is set to binary 0, the segment is defined as being comprised of up to 32 noncontiguous subsegments of storage containing 128 bytes each or up to 4K bytes of noncontiguous storage modulo 128. Thus, the SS bit 1 in the K field of the segment descriptor specifies the particular formulation technique, either segment or subsegment mode, to be used by the translation mechanism in generating the real address. Certain of the remaining bits in the K field specify whether or not the contents of the segment may be used for various functions, such as execute, read, write, etc.; however, since these bits are not pertinent to an understanding of the present invention, they need not be discussed further.

The next 17 bits (8-24) making up the base address field of the segment descriptor represent one of two things, depending upon whether the SS bit 1 of the K field specified that the segment mode or subsegment mode is to be used for real address formulation. If the segment mode was specified (the SS bit = 1), the 17 bits in the BA field represent the real address in local storage at which the segment comprised of up to 32 contiguous blocks begins. In other words, the BA field is pointing at a first one of up to thirty-two 128 byte granules of a specific contiguous segment. If the subsegment mode was specified (the SS bit = 0), the 17 bits in the BA field represent the real address in local storage of the start of a subsegment descriptor table which describes a segment comprising of up to 32 noncontiguous subsegments.

Finally, the five bits (27-31) in the L field also represent one of two things. In the segment mode of translation, they represent the five most significant bits of a binary number which specifies the length of a segment. The five bits provide for a minimum segment length of 128 bytes or one granule (as represented by the binary number 00000) and a maximum length of 4K (4096) bytes or 32 granules (as represented by the binary number 11111). In the subsegment mode of translation, these five bits of the L field define the number of the last valid entry in the subsegment descriptor table.

SUBSEGMENT DESCRIPTOR

Further, in FIG. 1, there is shown the preferred format for a subsegment descriptor (SSD). The subsegment descriptor is a 32-bit word comprised by a subsegment present field P (bit 0) and a base address field BA (bits 8-24). Bits 1-7 and 25-31 are not used and are all set to binary 0s.

The P field bit 0, the first bit of the subsegment descriptor, is used to determine whether the particular subsegment in the noncontiguous segment is present or not in local storage. If bit 0 is set to binary 1, the subsegment is currently resident in storage. If it is set to binary 0, the subsegment may not be used in address computation for whatever reason and the initiation of a subsegment reference in this case causes the generation of an interrupt. Thus, this first bit comprising the P field provides an alternate means, relative to the L field in the segment descriptor previously described, for controlling the length of a noncontiguous segment.

The 17 bits (8-24) of the BA field of the subsegment descriptor represent the real address in local storage of a particular subsegment of a segment comprised of up to 32 noncontiguous subsegments. In other words, the subsegment descriptor is pointing at a particular one of up to thirty-two 128 byte granules which can be located anywhere in storage on a 128 byte boundary.

VIRTUAL-TO-REAL ADDRESS TRANSLATION

SEGMENT MODE

Figure 2:
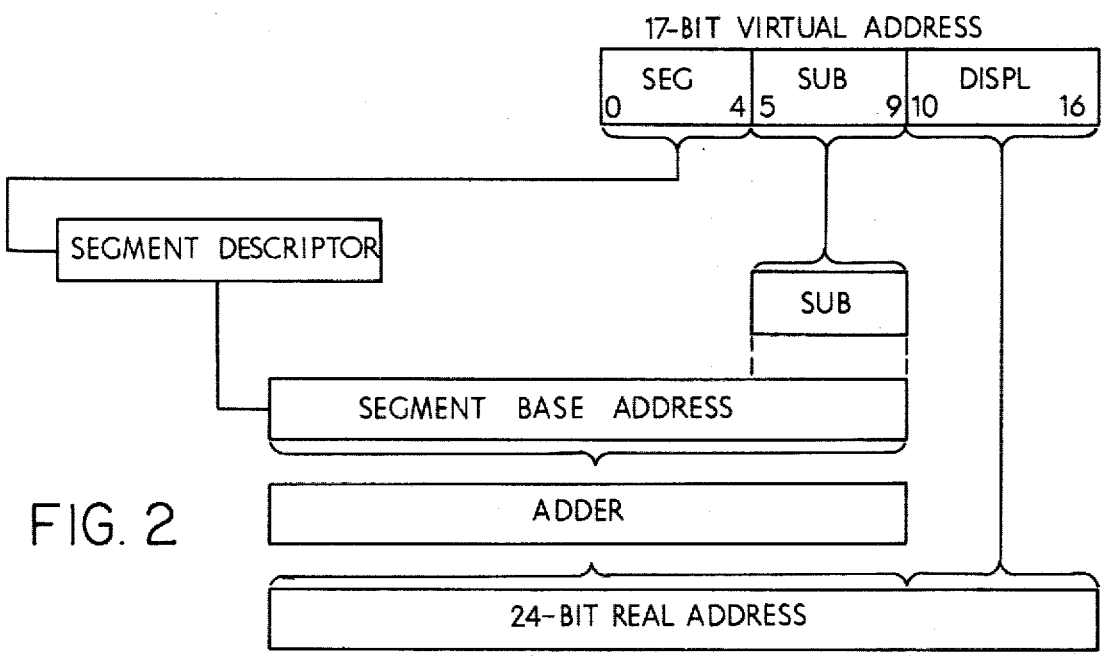
FIG. 2 is a diagrammatic representation of the steps of virtual-to-real address translation in the segment mode of operation.
Figure 3:
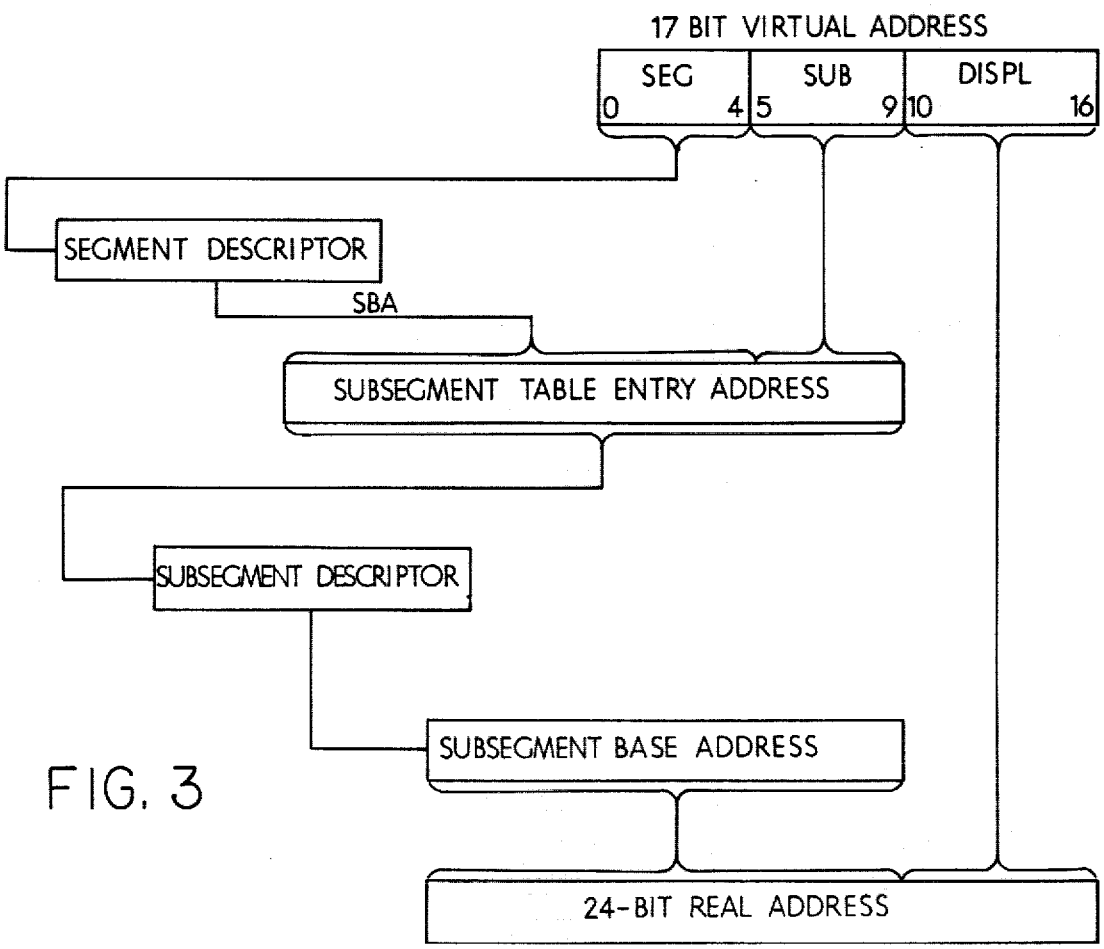
FIG. 3 is a diagrammatic representation of the steps of virtual-to-real address translation in the subsegment mode of operation.
Figure 4:
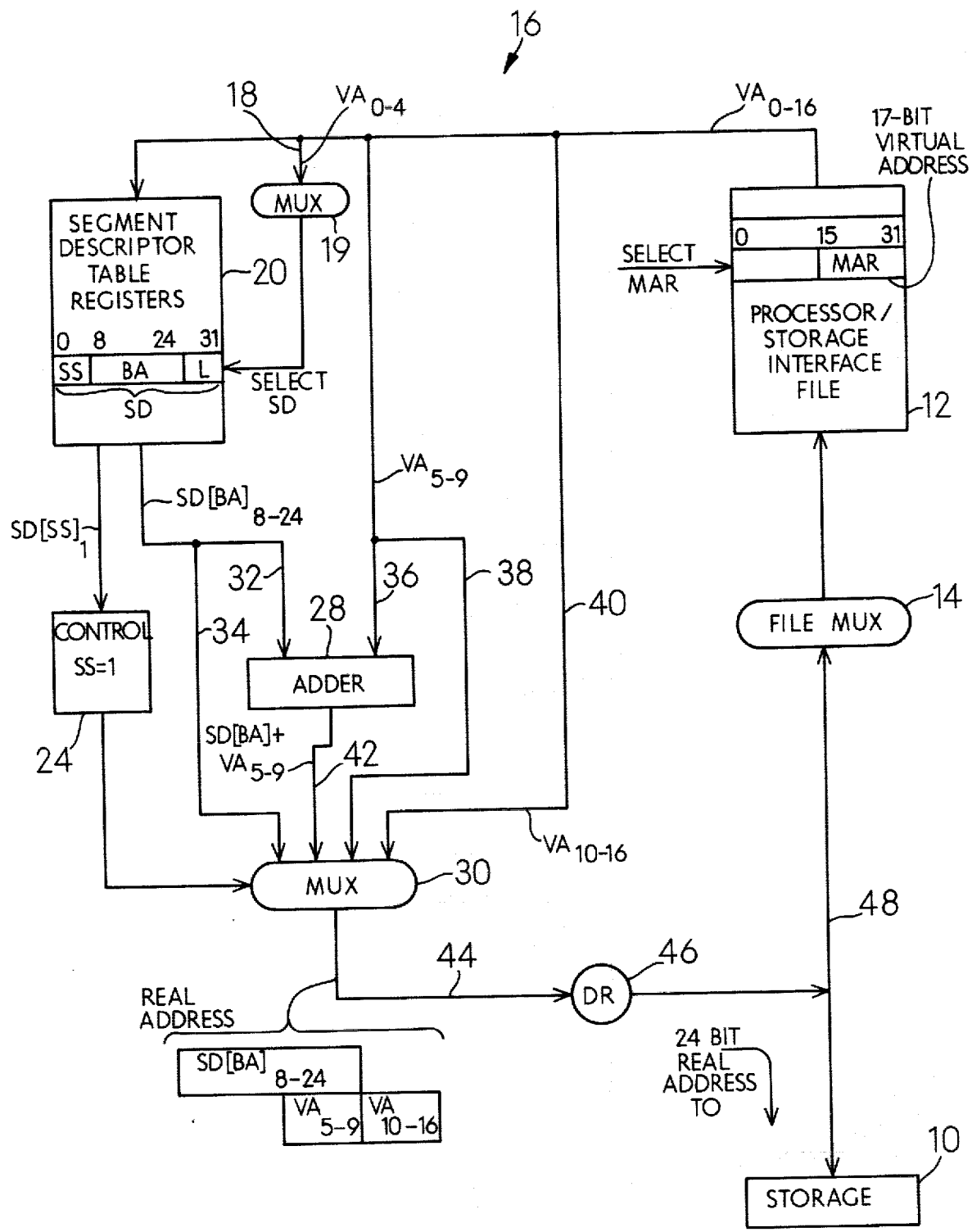
FIG. 4 is a block schematic diagram of the virtual-to-real address translation mechanism which provides a detailed illustration of the steps performed in the segment mode of operation by the translation mechanism.

Turning now to FIGS. 2 and 4, there is shown the virtual-to-real address translation steps (FIG. 2) performed by the translation mechanism (FIG. 4) of the present invention in the segment mode of operation. A flow chart diagrammatic representation of the segment mode, along with the subsegment mode, is depicted in FIG. 1.

FIG. 4 diagrammatically illustrates a storage 10, a processor/storage interface file 12 and a file multiplexer 14, with the remainder comprising preferred hardware implementation of the address translation mechanism, generally designated as 16, which will form part of the processor hardware.

The address translation operation, in either mode, is initiated when the contents (bits 15-31) of a memory address register (MAR) in the processor/storage interface file 12 are selected by suitable processor control hardware (not shown) in response to a programmed command. The contents of the MAR comprise the 17-bit virtual address (VA) having the composition previously described.

The five most significant bits, 0-4, comprising the SEG field of the selected VA are routed over a plurality of bit lines 18 and applied by a multiplexer (MUX) 19 to a bank of registers 20 which together contain a segment descriptor table made up of thirty-two segment descriptor (SD) entries. A given combination of binary 1s and 0s (out of a possible thirty-two) forming the first five bits of the VA causes the multiplexer 19 to select a particular one of the SD entries in the table, as depicted in FIGS. 1, 2 and 4.

Upon selection of a particular SD, several checks are carried out against the SD, as seen symbolically in FIG. 1 and partially in FIG. 4, to determine whether the translation operation can continue. As previously described, each SD has a K field and an L field. The K field includes a segment present (SP) or residency bit 0 and a segment structure (SS) bit 1. The SP bit 0 is examined as shown by the decision symbol captioned "SP=1?" in FIG. 1 and if the bit 0 equals a binary 1 an interrupt signal is produced indicating that the segment is not resident in storage and thus that the translation operation cannot continue. The SS bit 1 is applied to a control circuit 24 (FIG. 4) which if the bit 1 equals a binary 1 produces a control signal which determines that the address translation operation will continue in the segment mode. Examination of the SS bit 1 is shown in FIG. 1 by the decision symbols captioned "SS=1?". The L field of the SD (bits 27-31) and the SUB field of the VA (bits 5-9) are compared as shown by a decision symbol captioned "SUB>L?" in FIG. 1 and an interrupt signal is produced if SUB>L?, indicating that the range of the segment has been crossed and thus that the translation operation cannot continue.

Assuming that the SP bit 0 equals a binary 0 indicating that the segment is resident in storage 10, that the SS bit 1 equals a binary 1 indicating that translation is to proceed in the segment mode, that the SUB field of the VA is not greater than the L field of the SD, and also that the other attribute checks of the K field, previously briefly mentioned, do not result in the generation of an interrupt signal, then bits 8-24 of the selected SD which comprises the segment base address field (BA) are applied concurrently to an adder circuit 28 and a multiplexer (MUX) 30 of the translation mechanism 16 on pluralities of bit lines 32 and 34, respectively.

As briefly described earlier, in the segment mode of operation the 17 bits in the BA field of the SD represent the real address in local storage 10 at which a particular segment comprised of up to thirty-two contiguous blocks begins. In other words, the BA field is pointing at a first one of up to thirty-two 128 byte granules of a specific contiguous segment.

Concurrently with the fetching of a selected one of the thirty-two SDs in registers 20 and with the application of the segment BA of the selected one of the SDs to the adder circuit 28 and the multiplexer 30, bits 5-9 comprising the SUB field of the VA are routed over another plurality of bit lines 36 and 38 respectively to the adder circuit 28 and the multiplexer 30. Also, the seven least significant bits 10-16 comprising the DISPL field of the VA are simultaneously routed over yet another plurality of bit lines 40 to the multiplexer 30.

The SUB field of the VA, bits 5-9, when applied to the adder circuit 28 from lines 36 are added to the bits 8-24 of the segment BA field of the selected SD and the sum is applied on bit lines 42 to the multiplexer 30. The above-described operation is symbolically represented by the operation symbol captioned "ADDRESS ADDER" in FIG. 1. The sum, designated in FIG. 4 as $SD[BA] + VA_{5-9}$, now represents the real address in local storage 10 at which begins a specific one block of the up to thirty-two contiguous blocks of the selected segment. In other words, the SUB field of the VA in being added to the segment BA field points at a specific one 128 byte granule of the specific contiguous segment identified by the segment BA.

Finally, the real address of a specific byte within the particular contiguous segment (or one of up to 4K bytes) identified by the segment BA is formed by the operation of the multiplexer 30 which causes the attachment or concatenation of bits 10-16 of the DISPL field of the VA onto the sum of the segment BA and the SUB field of the VA. Bits 10-16 of the VA thus represent the real address in storage 10 of a particular byte within the specific one 128 byte granule identified by the above-described sum, $SD[BA] + VA_{5-9}$. The control circuit 24 being in the segment mode of operation state ($SD[SS]_1 = 1$) causes the MUX 30 to ignore the bit signals applied to it on lines 34 and 38. The 24-bit real byte address is outputted from the MUX 30 on bit lines 44 and sent on to the local storage 10 via a driver circuit 46 interposed in the lines 44. Therefore, with completion of the translation operation in the segment mode, a real address known to the hardware of the local storage 10 is produced in the form of a 24-bit byte address which specifies the physical location of the requested byte of data in the storage 10. The data so referenced is then routed from storage 10 to other areas of the processor in a conventional manner for carrying out processing operations.

SUBSEGMENT MODE

Referring now to FIGS. 3 and 5A-5C, there is shown the virtual-to-real address translation steps (FIG. 3) performed by the translation mechanism (FIGS. 5A-5C) respectively in the subsegment mode of operation.

In the subsegment mode, a particular one of the thirty-two segment descriptors in the registers 20 is selected and fetched by the first five bits, 0-4, of a given VA in a manner identical to that just described in connection with the segment mode. However, this time the SS bit 1 of the selected SD is a binary 0 which when applied to the control circuit 24 produces a control signal which determines that the address translation operation will continue in the subsequent mode.

Since the subsegment descriptor table which contains thirty-two subsegment descriptors (SSD) is resident in local storage 10, the real address of a desired one of the subsegment descriptors in storage 10 must first be formulated by the translation mechanism 16 and an extra storage cycle carried out in order to fetch the selected subsegment descriptor before the real address of the location in storage of the requested data can be finally generated by the translation mechanism 16.

Consequently, the multiplexer 30 in response to the subsegment mode of operation state of the control circuit 24 (SD[SS]$_1$ = 0) ignores the bit signals applied to it on lines 40 and 42 and causes the SUB field of the VA, bits 5-9, received on lines 38 to be attached or concatenated to the BA field, on lines 34, of the selected segment descriptor. The output on lines 44 from the MUX 30, having two implied binary 0s following the least significant bit of the SUB field of the VA, now represents a 24-bit real address in local storage 10 of a particular entry in the subsegment descriptor table resident in storage 10. Specifically, the 17-bit BA field represents the real address of the start of the subsegment descriptor table in storage 10, while the bits 5-9 of the VA, concatenated to the BA (with two implied trailing binary 0s), represent the real address in storage 10 of the selected one of the thirty-two subsegment descriptors within the table. In other words, the 24-bit real address points at a specific subsegment descriptor resident in local storage 10. It should be pointed out here that since each subsegment descriptor is a 32-bit word and that thirty-two subsegment descriptors make up the table, the latter will fit in one granule (128 bytes) of storage. Therefore, there is no possibility that individual entries in the table will be found at noncontiguous storage locations.

Figure 5A:
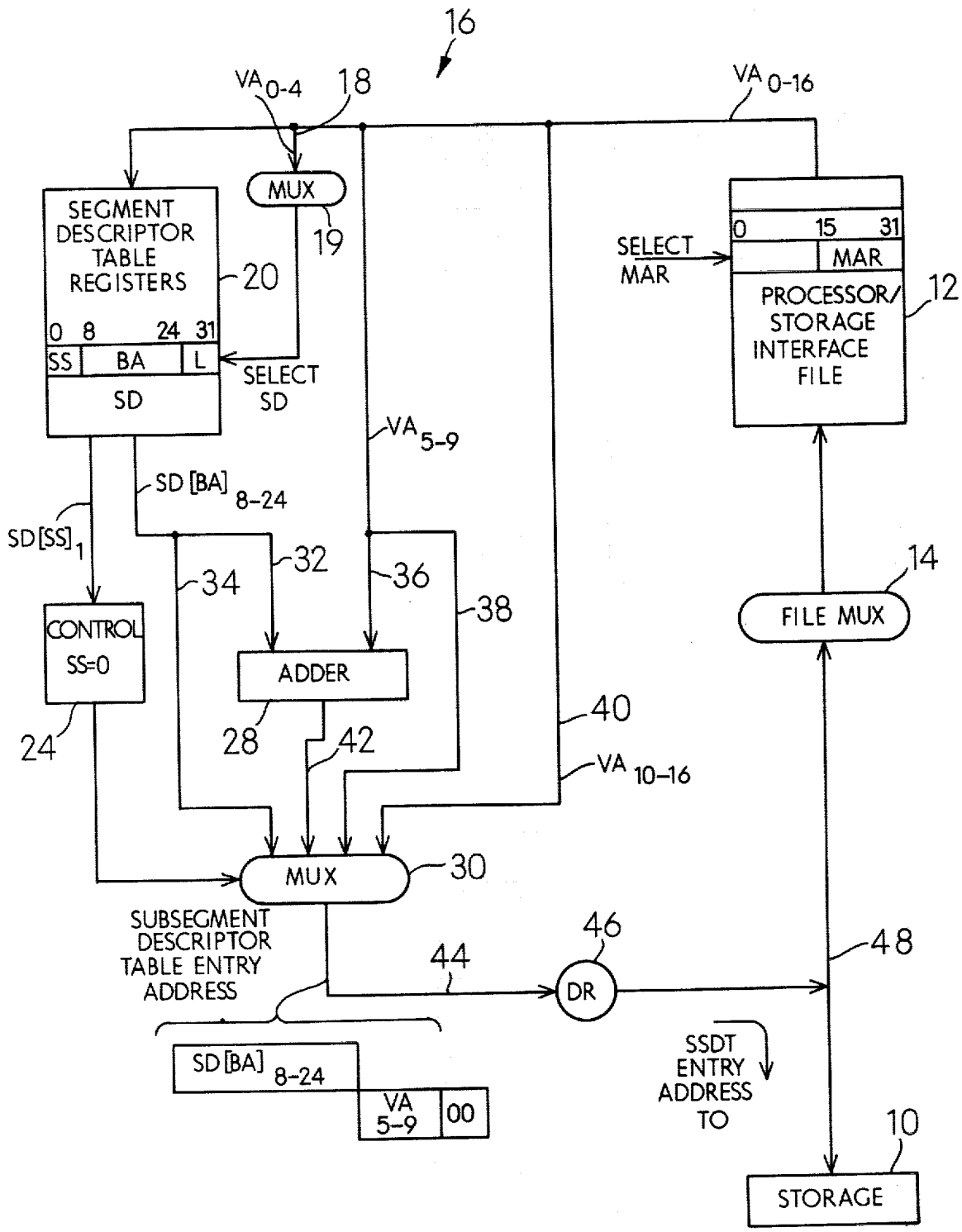
FIGS. 5A through 5C are block schematic diagrams of the translation mechanism providing detailed illustrations of the steps performed in the subsequent mode of operation by the translation mechanism.
Figure 5B:
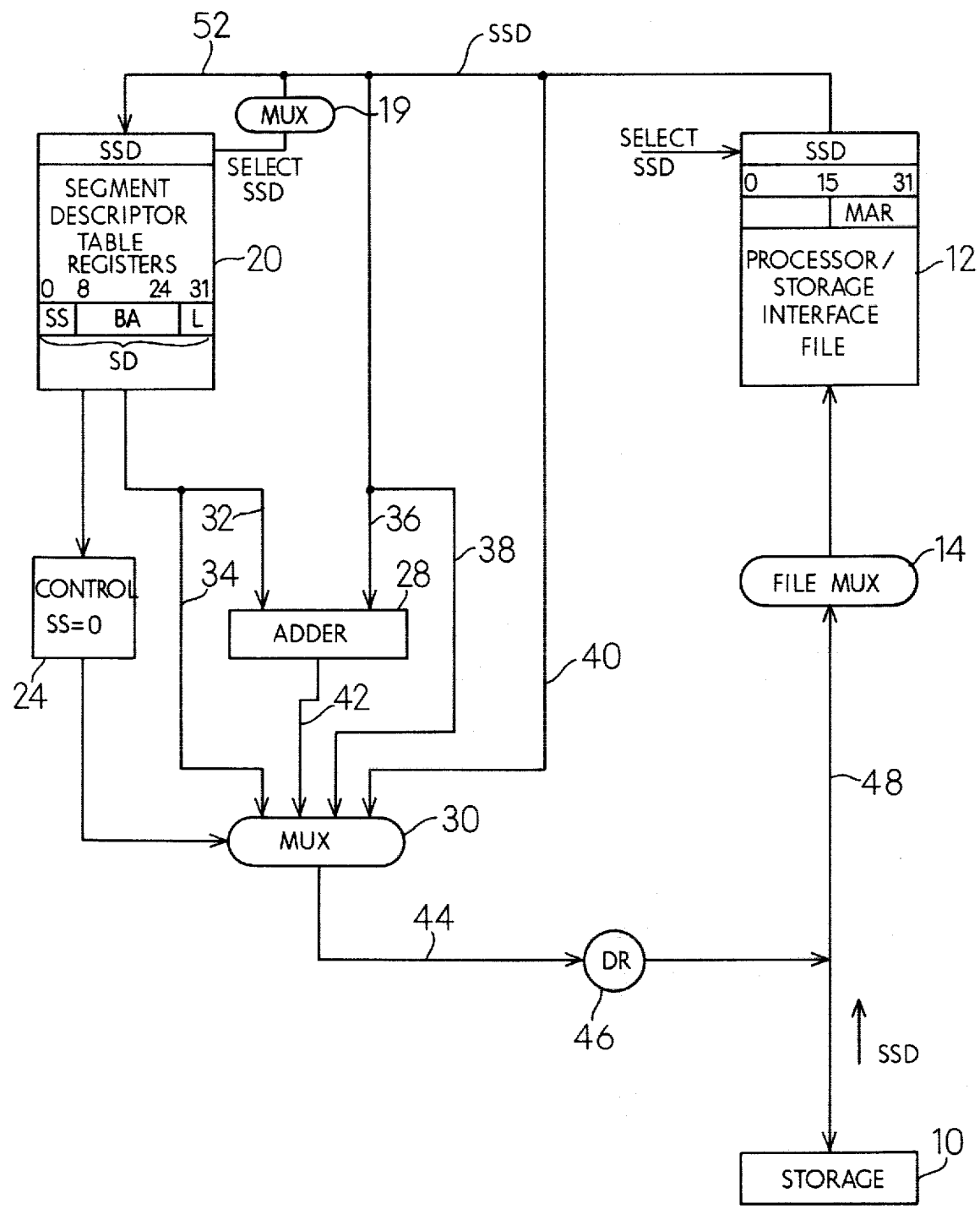
Figure 5C:
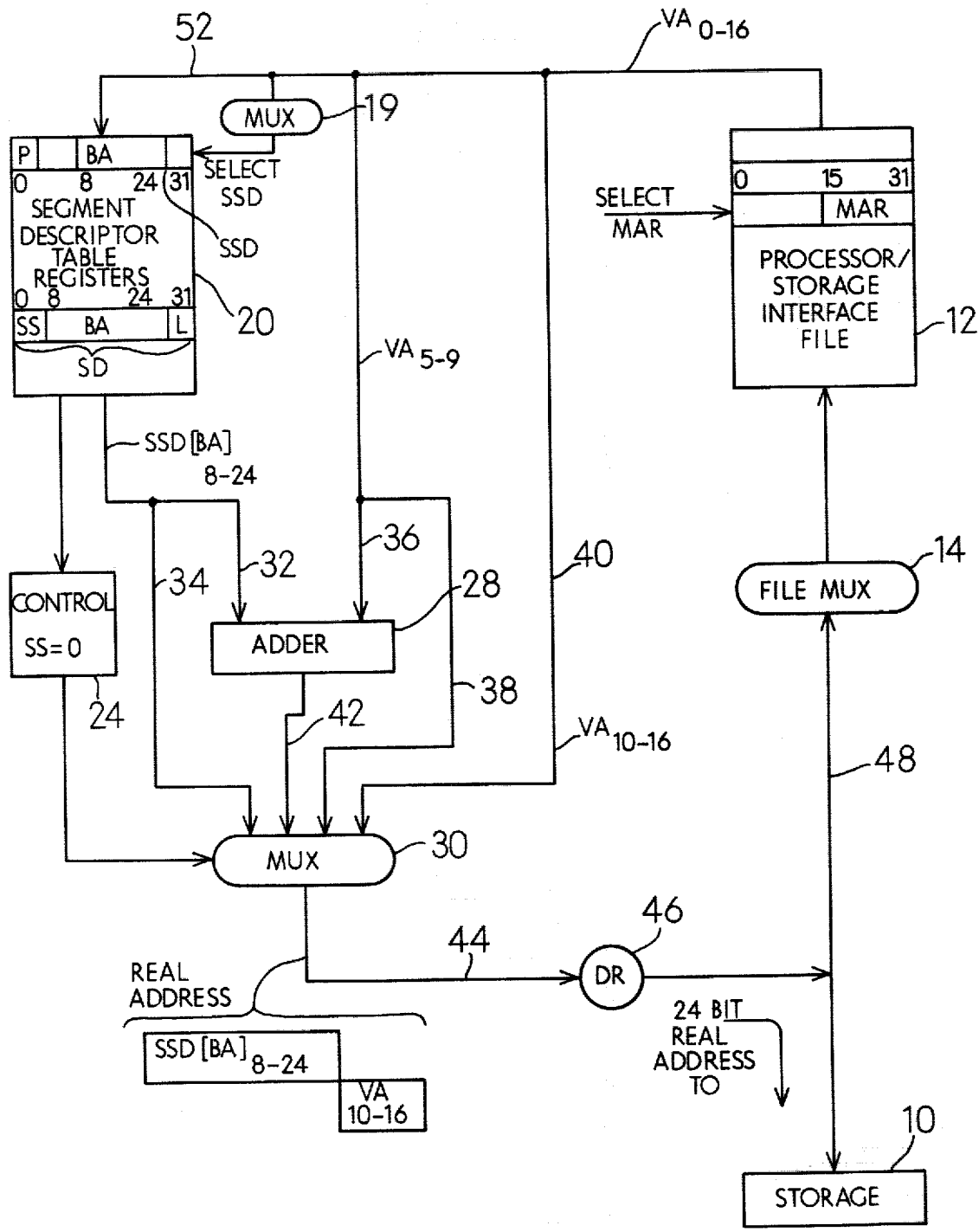

As seen in FIG. 5A, the subsegment descriptor table entry real address is sent to local storage by driver circuit 46 and the subsegment descriptor located at that address is routed from the storage 10 on bus 48 to the interface file 12 via file multiplexer 14 and therefrom on data transfer lines 52 to the registers 20 where it is selected by the multiplexer 19, as illustrated in FIG. 5B.

The P field, bit 0, of the selected subsegment descriptor is examined as shown by the decision symbol captioned "P = 1?" in FIG. 1 and if the bit 0 equals a binary 0 an interrupt signal is produced indicating that the particular subsegment of a noncontiguous segment cannot be used in address translation and thus that the translation operation cannot continue. Assuming that the bit 0 is a binary 1, indicating that the subsegment is currently resident in storage, the translation operation continues with application of the subsegment base address BA, bits 8-24 of the SSD, via lines 32 and 34 respectively to the adder 28 and the multiplexer 30.

As briefly described earlier, the 17 bits in the BA field of the SSD represent the real address in local storage 10 of a particular subsegment of a segment comprised of up to thirty-two noncontiguous subsegments. In other words, the BA field is pointing at a particular one of up to thirty-two 128 byte granules which can be located anywhere in storage on a 128 byte boundary.

The real address of a specific byte within the particular selected one subsegment (or one of up to a possible 128 bytes) is formed by the operation of the multiplexer 30 which causes the attachment or concatenation of bits 10-16 of the DISPL field of the VA from lines 40 onto the 17-bit BA field of the subsegment descriptor. Bits 10-16 of the VA thus represent the real address in storage 10 of a particular byte within the specific one 128 byte granule identified by the BA field of the SSD. The control circuit 24 being in the subsegment mode of operation state causes the MUX 30 to ignore the bit signals applied to it on lines 38 and 42. The 24-bit real byte address is outputted from the MUX 30 on bit lines 44 and sent to the local storage 10 via driver circuit 46. Therefore, with completion of the translation operation in the subsegment mode, a real address known to the hardware of the local storage 10 is produced in the form of a 24-bit byte address which specifies the physical location of the requested byte of data in the storage 10. The data so referenced is then routed from storage 10 to other areas of the processor in a conventional manner for carrying out processing operations.

Figure 6:
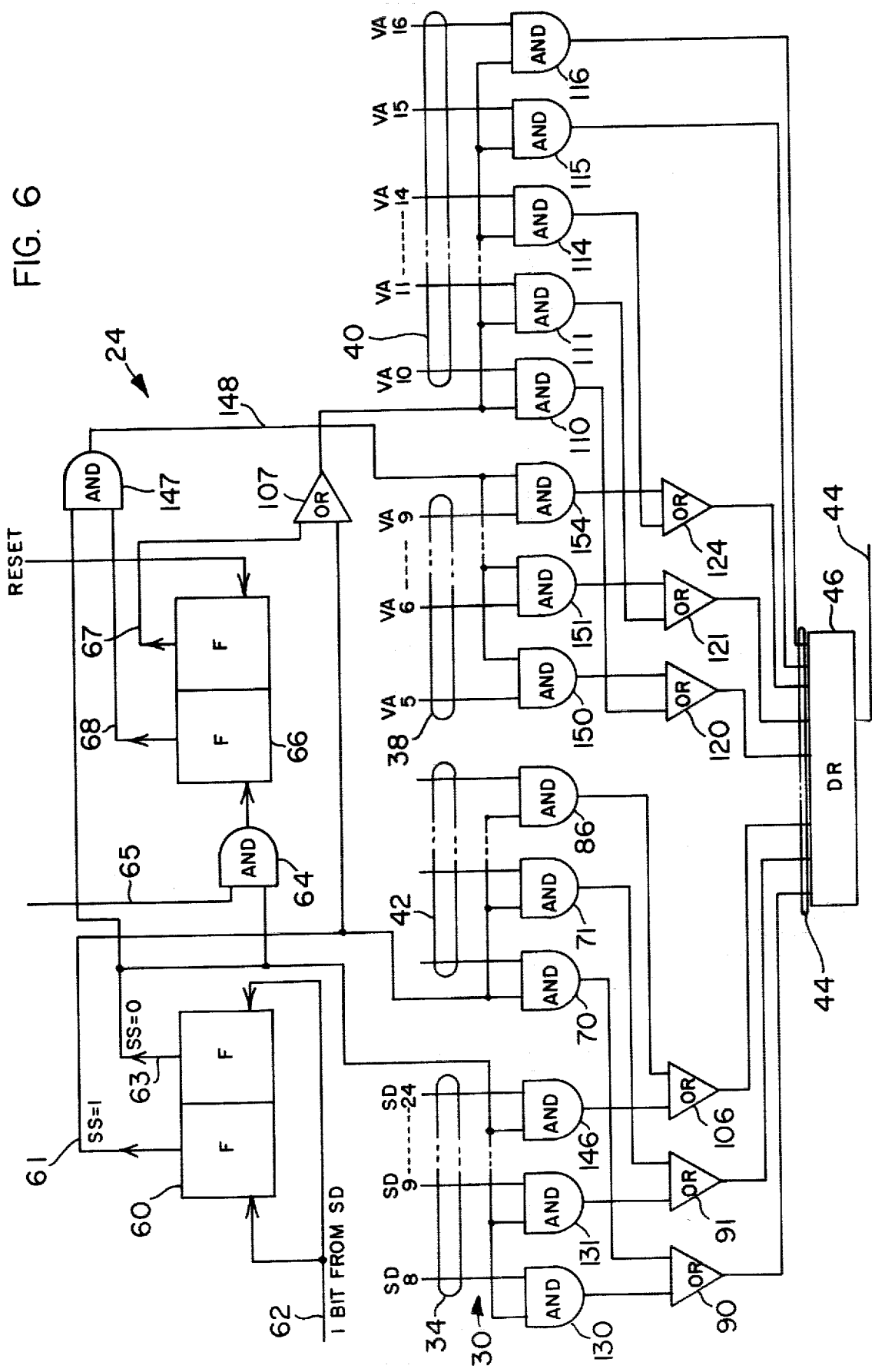
FIG. 6 shows in more detail one example of logic circuitry that may be employed in the control shown in FIGS. 4 and 5A through 5C.

Referring now more specifically to FIG. 6, there is shown in more detail one example of logic circuitry that may be employed in the control circuit 24 shown in FIGS. 4 and 5A through 5C to control adder 2B and multiplexer 30 of these FIGS. Multiplexer 30, as well as multiplexers 14 and 19 may be of standard types. Multiplexer 30 may be made up essentially of the AND and OR circuits 130 through 146; 70 through 86; 150 through 154; 110 through 116; 90 through 106; and 120 through 124 as shown in FIG. 6. Multiplexers 14 and 19 of FIGS. 4 and 5A-5C may be respectively, for example, of types 10174 and 10173 available from the Fairchild Camera and Instruments Corporation. Control circuit 24 may include a flip-flop 60 that is set in one state by a binary 1, SS = 1, appearing in the 1-bit position of the segment descriptor previously described and set in the other state when the 1-bit position of the segment descriptor is a binary 0, SS = 0. When SS = 1, flip-flop 60 will be set such that its output on lead 61 is high. This condition of flip-flop 60 defines the operation as the segment mode. When SS = 0, flip-flop 60 is set such that the output on line 63 is high. This condition of flip-flop 60 defines the operation as the subsegment mode.

It may be recalled that in the segment mode of operation, there is only one step, or cycle of operation, involved in translating the virtual address to the real address for addressing storage device 10. However, in the subsegment mode of operation, two steps are involved. When in the subsegment mode of operation, flip-flop 60 produces a high output over line 63 to AND circuit 64, which AND circuit 64 in conjunction with a cycle timing signal on line 65 will set a flip-flop 66 into its second state, such that a high output appears on line 67. Flip-flop 66 is set in its second state only during a second cycle of the address translation operation. During the first cycle of operation, flip-flop 66 is set in its first state such that a high signal appears at its output over line 68. Flip-flop 66 is set to its second state by a cycle timing signal appearing at AND circuit 64 in coincidence with a high output from flip-flop 60 over line 63. The cycle timing signal may be generated by the computer system so as to appear in coincidence with a high signal on line 63 at the beginning of the second cycle of the address translation operation. A reset signal to flip-flop 66 may be generated from the SELECT MAR signal shown in FIGS. 4 and 5A-5C, for example.

The previously discussed segment mode of operation, where SS = 1, is explained in more detail by reference to FIG. 6 where a signal over line 61 is applied to a group of AND circuits 70 through 86. AND circuits 70 through 86 operate such that if a high signal appears on both their inputs, a high signal will appear at the output. The other inputs to the AND circuits 70 through 86 are the sum of the binary signals appearing at the inputs of adder 28 on lines 32 and 36. It will be recalled that these binary signals are those from the SD positions 8 through 24 and those from virtual address positions 5 through 9. The virtual address signals from positions 5 through 9 are added to the five low order SD positions 8 through 24, e.g., positions 19 through 24. Adder 28 is thus controlled at its output by AND circuits 70 through 86 to produce on lines 44 the sum of the binary signals appearing on lines 32 and 36. The outputs of AND circuits 70 through 86 are fed through OR circuits 90 through 106, respectively. OR circuits 90 through 106 operate such that if either input is high, the output will be high. Thus, when a high signal appears on line 61 from flip-flop 60, AND circuits 70 through 86 will pass the sum produced by adder 28 through OR circuits 90 through 106 to driver 46 such that the first or high order 17 positions are the outputs from adder 28. Driver 46 may be of the 10123 type available from the Fairchild Camera and Instrument Corporation. The high output from flip-flop 60 over line 61 is also fed through OR circuit 107 to control a group of AND circuits 110 through 116. The other sides of AND circuits 110 through 116 are fed by the lines 40 shown in FIGS. 4 and 5A through 5C and shown in more detail in FIG. 6. These lines 40 are the virtual address positions 10 through 16 from the processor storage interface file 12. Thus, when flip-flop 60 is producing a high output on lines 61, the signals on lines 40 are passed through AND circuits 110 through 116 to and through a series of OR circuits 120 through 124 and, for virtual address positions 15 and 16, directly from AND circuits 115 and 116, to driver 46. It may thus be seen how the 17 positions of the segment descriptor are concatenated on to the seven positions of the virtual address appearing on lines 40. The output of multiplexer 30 appears on lines 44. In this way, a real address is generated and supplied over line 44 through driver circuit 46 to the storage device 10 when the address translation mechanism of the present invention is operated in its first mode.

When operated in the second mode, a high signal appears on line 63 at the output of flip-flop 60 and a low signal appears on line 61. Thus, the AND circuits opened by the high on line 61 are closed during the subsegment mode of operation while the output line 63 from flip-flop 60 is high. During the subsegment mode of operation, it will be noted that in the first step or cycle, while flip-flop 66 produces a high on line 68, the high signal on line 63 is applied to AND circuits 130 through 146 such that AND circuits 130 through 146 will pass the signals appearing on lines 34 through OR circuits 90 through 106 to driver 46. Thus, the signals from segment descriptor positions 8 through 24 are fed directly to multiplexer 30 over lines 34 (FIGS. 4 and 5A-5C) rather than going through adder 28. Also, during this time in the first step, when a high signal appears on the output line 68 from flip-flop 66, a signal is present at the output of AND circuit 147, which signal from the output of AND circuit 147 is fed over line 148 to the inputs of AND circuits 150 through 154. AND circuit 147 operates as does the previously described AND circuit. It may be recalled that flip-flop 66 produces a high output on line 68 during the first step of the subsegment mode of operation and that flip-flop 60 produces a high output on line 63 during the subsegment mode of operation. These two signals combine to produce the high signal on line 148. The high signal on line 148 opens AND circuits 150 through 154 to pass the signals from virtual address positions 5 through 9 to and through OR circuits 120 through 124 to driver 46. The two lower order input positions of driver 46 during this step of operation are receiving low signals or binary 0s since there are no high outputs from AND circuits 115 or 116 during this interval. Thus, during the first cycle of a subsegment mode of operation, a real address is produced by multiplexer 30 over lines 44 which is a concatenation of the signals appearing on lines 34 and the signals appearing on lines 38. As has previously been described, the real address appearing on lines 44 at this first cycle of the subsequent mode of operation is taken to storage device 10 to read out a subsegment descriptor that is taken as previously described through the processor storage interface file and over line 52 to the segment descriptor table registers to appear at the SSD location as shown in FIG. 5B. At this point, the first cycle of the subsegment mode of operation will have been completed, and a cycle timing signal will be passed through AND circuit 64 to set flip-flop 66 such that a high signal appears on output line 67. The other input of AND circuit 64 is high since flip-flop 60 is set to produce a high signal on output line 63. During this second cycle of the address translation operation, a signal from line 67 is fed through OR circuit 107 to control AND circuits 110 through 116 to pass the signals from virtual address positions 10 through 16 through these AND circuits and through OR circuits 120 through 124 to driver 46. At the same time that the signals are fed from virtual address positions 10 through 16 to multiplexer 30, signals from the subsegment descriptor positions 8 through 24 are also fed to multiplexer 30. These subsegment descriptor signals appear on line 34 during this second cycle of operation as may be seen in FIG. 5C and in FIG. 6, and are applied through AND circuits 130 through 146 under control of the signal on line 63 from flip-flop 60. Thus, the subsegment descriptor signals from positions 8 through 24 are fed through AND circuits 130 through 146 and in turn through OR circuits 90 through 106 to driver 46 such that the subsegment descriptor signals from positions 8 through 24 are concatenated with the signals from virtual address positions 10 through 16 at multiplexer 30 and are supplied over lines 44 as a real address to storage device 10.

In summary, the control device 24 controls the adder 28 at its output to produce the sum of the binary signals from virtual address positions 5 through 9 and the binary signals from the low order positions of the segment descriptor positions 8 through 24 when operating in the segment mode. This sum is concatenated with the signals from virtual address positions 10 through 16 to form the real address on lines 44 from multiplexer 30.

In the subsegment mode of operation, it has been seen that the segment descriptor signals from line 34 are concatenated with the virtual address signals from positions 5 through 9 on line 38 along with implied low order zeroes to produce a first real address over lines 44 to storage device 10. During a second cycle of the subsegment mode of operation, it was seen how the subsegment descriptor signals appearing at positions 8 through 24 over lines 34 are concatenated with the virtual address signals from positions 10 through 16 on line 40 to form a real address on lines 44 to address the information sought in storage device 10.

Having thus described the invention, what is claimed is:

1. In a computer system including a first storage means responsive to real addresses; second storage means for storing a virtual address; and a translating mechanism for translating a virtual address in accordance with either one or the other of two modes of operation to form a real address, said virtual address having first, second and third portions, said real address identifying at least a portion, such as a byte, of one of a plurality of contiguous blocks comprising a segment of storage when formed by virtual address translation in a first mode and identifying at least a portion, such as a byte, of one of a plurality of noncontiguous segments comprising a segment of storage when formed by virtual address translation in a second mode; said translating mechanism being comprised by:

first table storage means for storing a table comprised of a plurality of segment descriptors, each of said segment descriptors having a first field portion and a second field portion;

second table storage means for storing a table comprised of a plurality of subsegment descriptors, each of said subsegment descriptors having field portions, selecting means responsive to the contents of said first portion of said virtual address stored in said second storage means, in either of said modes of operation, to select a predetermined one of said plurality of segment descriptors from said table stored in said first table storage means;

control means responsive to the contents of said first field portion of said selected segment descriptor, when selected, for controlling said translating mechanism to operate in one or the other of the two modes of operation for translating said virtual address into said real address;

adder means responsive to said control means for adding said second portion of said virtual address to said second field portion of said selected segment descriptor to form a sum thereof upon said translating mechanism being controlled to operate in said first mode; and concatenating means responsive to said control means for concatenating said third portion of said virtual address onto said sum to form said real address upon said translating mechanism being controlled to operate in said first mode and responsive to said control means for concatenating said second portion of said virtual address onto said second field portion of said selected segment descriptor for selecting a predetermined one of said plurality of subsegment descriptors and for concatenating said third portion of said virtual address onto a field portion of said selected subsegment descriptor to form said real address in response to said control means controlling said translating mechanism to operate in said second mode.

2. The computer system as recited in claim 1, wherein said first storage means and said second table storage means each comprise a portion of a single storage means in said computer system.

3. In a computer system including a first storage means responsive to real addresses; second storage means for storing a virtual address; and a translating mechanism for translating a virtual address to form a real address, said virtual address having first, second and third portions; the improvement comprising:

first table storage means for storing a table comprised of a plurality of segment descriptors, each of said segment descriptors having a first field portion and a second field portion;

second table storage means for storing a table comprised of a plurality of subsegment descriptors, each of said subsegment descriptors having field portions;

selecting means responsive to the contents of said first portion of said virtual address stored in said second storage means for selecting a predetermined one of said plurality of segment descriptors from said table stored in said first table storage means;

control means responsive to the contents of said first field portion of said selected segment descriptor for controlling said translating mechanism to operate in either a first or a second mode of operation for translating said virtual address into said real address;

adder means responsive to said control means for adding said second portion of said virtual address to said second field portion of said selected segment descriptor to form a sum when said translating mechanism is controlled to operate in said first mode;

concatenating means responsive to said control means for concatenating said third portion of said virtual address onto said sum to form said real address when said translating mechanism is controlled to operate in said first mode and responsive to said control means for concatenating said second portion of said virtual address onto said second field portion of said selected segment descriptor for selecting a predetermined one of said plurality of subsegment descriptors when said translating mechanism is controlled to operate in said second mode; and means for thereafter concatenating said third portion of said virtual address onto a field portion of said selected subsegment descriptor to form said real address in said second mode of operation.

4. The computer system as recited in claim 3, wherein said real address identifies a portion of one of a plurality of contiguous blocks forming a segment of storage when formed in said first mode and identifies a portion of one of a plurality of noncontiguous blocks forming a segment of storage when formed in said second mode.

5. The computer system as recited in claim 4, wherein said first storage means and said second table storage means each comprise a portion of a single storage means in said computer system.

* * * * *